(12) United States Patent
Mahedy et al.

(10) Patent No.: US 11,669,583 B2
(45) Date of Patent: *Jun. 6, 2023

(54) GENERATING INTERACTIVE SCREENSHOT BASED ON A STATIC SCREENSHOT

(71) Applicant: Pager Technologies, Inc., New York, NY (US)

(72) Inventors: Alexander Mahedy, New York, NY (US); Joseph Quadrino, Olympia, WA (US); Duncan Buck, Berlin (DE); Mingxiang Dai, Durham, NC (US)

(73) Assignee: Pager Technologies, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/731,617

(22) Filed: Apr. 28, 2022

(65) Prior Publication Data
US 2022/0253503 A1 Aug. 11, 2022

Related U.S. Application Data

(63) Continuation of application No. 17/303,074, filed on May 19, 2021, now Pat. No. 11,341,205.
(Continued)

(51) Int. Cl.
*G06F 17/00* (2019.01)
*G06F 16/955* (2019.01)
(Continued)

(52) U.S. Cl.
CPC ...... *G06F 16/9566* (2019.01); *G06F 3/04842* (2013.01); *G06F 16/954* (2019.01); *G06F 16/958* (2019.01); *G06F 16/9558* (2019.01)

(58) Field of Classification Search
CPC .............. G06F 16/9566; G06F 16/954; G06F 16/9558; G06F 16/958; G06F 16/951;
(Continued)

(56) References Cited

U.S. PATENT DOCUMENTS 6,073,135 A * 6/2000 Broder .................. G06F 16/954
8,996,682 B2 3/2015 Stevenson et al.
(Continued)

OTHER PUBLICATIONS

Kasi, Sainath Gadhamsetty, et al., "Method for Fast and Accurate Extraction of Key Information from Web Pages", 2016 IEEE International Conference on Web Services (ICWS), DOI: 10.1109/ICWS.2016.71, pp. 500-505, Jun. 1, 2016 (Year: 2016).*
(Continued)

*Primary Examiner* — Laurie A Ries
(74) *Attorney, Agent, or Firm* — Lowenstein Sandler LLP

(57) ABSTRACT

Aspects of the disclosure provide for mechanisms for generating interactive screenshot based on a static screenshot. A method of the disclosure includes extracting application markers within a screenshot, determining, based on the application markers, an application in the screenshot, extracting content markers within the application of the screenshot based on the application, obtaining a Uniform Resource Locator (URL) associated with each of the extracted content markers, generating an interactive element based on each of the extracted content markers and corresponding URL, and updating each of the extracted content markers with a corresponding generated interactive element.

20 Claims, 7 Drawing Sheets

Related U.S. Application Data

(60) Provisional application No. 63/027,824, filed on May 20, 2020.

(51) Int. Cl.
  *G06F 16/958* (2019.01)
  *G06F 3/04842* (2022.01)
  *G06F 16/954* (2019.01)

(58) Field of Classification Search
  CPC .... G06F 3/04842; G06F 3/0481; G06F 9/451; G06V 2201/02; G06V 20/20
  See application file for complete search history.

(56) References Cited

U.S. PATENT DOCUMENTS

| | | |
|---|---|---|
| 2003/0050927 A1 | 3/2003 | Hussam |
| 2010/0153422 A1* | 6/2010 | Baluja .................. G06F 40/134 707/E17.014 |
| 2010/0268700 A1 | 10/2010 | Wissner et al. |
| 2012/0005572 A1 | 1/2012 | Rundle |
| 2014/0218385 A1* | 8/2014 | Carmi ..................... G06T 7/136 345/620 |
| 2015/0128017 A1 | 5/2015 | Fithian et al. |
| 2016/0171106 A1* | 6/2016 | Song ..................... G06F 16/951 707/709 |
| 2017/0017648 A1 | 1/2017 | Pearlman et al. |
| 2017/0052983 A1* | 2/2017 | Pearlman ............ G06F 16/5866 |
| 2017/0212892 A1 | 7/2017 | McIntosh et al. |
| 2018/0115584 A1 | 4/2018 | Alhumaisan et al. |
| 2018/0225265 A1* | 8/2018 | Fitzpatrick ............ G06F 40/143 |
| 2019/0250999 A1 | 8/2019 | Miance et al. |
| 2020/0073903 A1* | 3/2020 | Jain ..................... G06F 16/9558 |
| 2020/0117488 A1 | 4/2020 | Mastracci |
| 2020/0356530 A1 | 11/2020 | Guest |

OTHER PUBLICATIONS

Jones, Paul, et al., "Towards Automatic Linkage of Knowledge Worker's Claims with Associated Evidence from Screenshots", 2017 IEEE Third International Conference on Big Data Computing Service and Applications (BigDataService), pp. 17-22. (Year 2017).

* cited by examiner

GENERATING INTERACTIVE SCREENSHOT BASED ON A STATIC SCREENSHOT

RELATED APPLICATIONS

This application is a continuation of U.S. patent application Ser. No. 17/303,074, filed May 19, 2021, the entire contents of which is hereby incorporated by reference herein.

TECHNICAL FIELD

Embodiments of the disclosure relate generally to memory sub-systems, and more specifically, relate to generating interactive screenshot based on a static screenshot.

BACKGROUND

Content sharing (e.g., articles, restaurants, shows, songs, videos, social media posts) is typically performed through Uniform Resource Locator (URL) sharing or screenshot sharing of the content.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
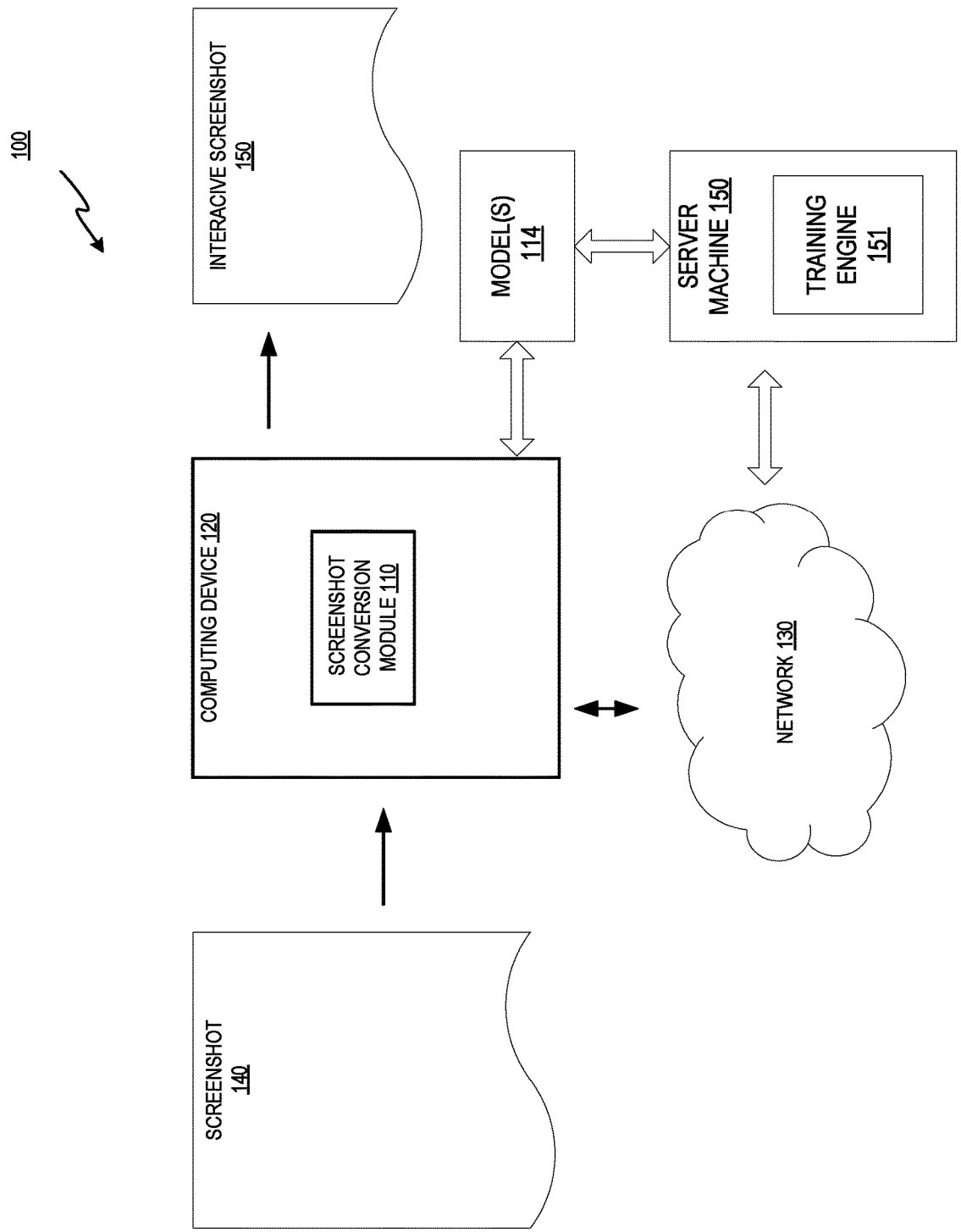
FIG. 1 illustrates a block diagram of an example computer system in which implementations of the disclosure may operate, in accordance with some embodiments of the present disclosure.

Aspects of the present disclosure are directed to generating interactive screenshot based on a static screenshot. Screenshots can be a static digital image that captures the contents of the display (e.g., a computer device, mobile device, etc). Screenshots are created by the operating system or software running on the computer device or mobile device, for example. In general, screenshots can be utilized to share contents of the display with other computer devices or mobile devices. Content sharing can be performed through URL (e.g., link) which provides the receiver with a link to the content or specific location of the web-based application where the content is located, however, with no image the receiver has no immediate reference to the purpose or intention behind the URL. In some embodiments, the URL may be shared with an auto-populated snapshot of the content during sharing of the URL, however, in these instances the snapshot of the content is directed to the content as a whole rather than a specific portion that may have been of interest to the receiver.

Content sharing can be performed through sharing a screenshot which provides an image that reflects the content, however, with no links the receiver has no way of immediate access to the content. While the intent and purpose of the content can be actualized from the screenshot by the receiver, the receiver is left requesting a URL, to interact with the content, manually search the internet for the URL to interact with the content, or forgoing access to the URL. Further, in some embodiments, the sender of the screenshot or user who screenshotted the content may lose track of the URL that corresponds to the content, in which case the user, receiver, and/or sender would have to scrape the internet manually to find the content to interact with it directly.

Aspects of the present disclosure address the above and other deficiencies by having a processing device combine a static screenshot of content with a URL of the content to generate an interactive screenshot. The processing device identifies an application within the static screenshot. The processing device, based on the identified application, extracts information from within the application in the static screenshot. The processing device, based on the identified application and the extracted information from the static screenshot, performs a query search to generate a URL that corresponds to the static screenshot as whole and/or portions of the static screenshot. The processing device, based on the generated URL, updates the static screenshot as a whole and/or the relevant portions of the static screenshot with the URL to generate an interactive screenshot.

Advantages of the present disclosure include, but are not limited to, sharing interactive screenshots that provide a user with a screenshot that links to the screenshotted content, screenshots that deep link to other applications, and method of bookmarking URL links via screenshots.

Various aspects of the above referenced methods and systems are described in details herein below by way of examples, rather than by way of limitation. The examples provided below discuss combining a static screenshot of content with a URL of the content to generate an interactive screenshot. In other examples, the URL may be a Uniform Resources Identifier (URI) or any other suitable unique sequences of characters that identifies a logical or physical location. URI refers to a unique sequence of characters that exist independent of the source and can identify and/or define an information resources, such as, for example, a web page or platform.

FIG. 1 illustrates a block diagram of an example computer system 100 in which implementation of the disclosure may operate. As illustrated, computer system 100 can include a computing device 120 connected to a network 130. Network 130 may be a public network (e.g., Internet), a private network (e.g., a local area network (LAN) or wide area network (WAN)), or combination thereof.

The computing device 120 may perform image processing to identify an application in a screenshot, extract contents from the application within the screenshot, and recognize the source of content of a screenshot to effectively generate an interactive screenshot. The computing device 120 may be a desktop computer, a laptop computer, a smartphone, a tablet computer, a server, a scanner, or any suitable computing device capable of performing the techniques described herein. In some implementations, the computing device 120 can be (and/or include) one or more computing devices 700 of FIG. 7.

The screenshot 140 may be received by the computing device 110. The screenshot 140 may not include any metadata or insufficient metadata to determine which application was screenshotted. Depending on the embodiments, the screenshot 140 may include metadata. The screenshot 140 may include any text(s), or image(s), including one or more characters (e.g., letters and/or numbers), words, sentences, etc. The screenshot 140 may be received in any suitable manner. For example, the computing device 110 may receive the screenshot 140 from another computing device 120 or any suitable computing device capable of capturing screenshots. In some instances, the screenshot 140 can originate in the computing device 120. In some instances, the screenshot is a photo of an application, operating system, any other suitable content or document that contains images and/or URL links. Additionally, in instances where the computing device 110 is a client device connected to a server via the network 130, the client device may download the screenshot from the server.

The screenshot 140 may be used to train a set of machine learning models or may be a new screenshot for which identification is desired. Accordingly, in the preliminary stages of processing, the screenshot 140 can be prepared for training the set of machine learning models or subsequent identification. For instances, in the screenshot 140, structural elements, icon elements, and content elements may be manually or automatically selected.

The computing device 120 may include a screenshot conversion module 110. The screenshot conversion module 110 may be a software module executable by one or more general purpose and/or specialized hardware devices. The screenshot conversion module 110 may include instructions stored on one or more tangible, machine-readable media of the computing device 120 and executable by one or more processing devices of the computing device 120.

In one embodiment, the screenshot conversion module 110 may use a set of trained machine learning models 114 that are trained and used to identify structural elements, icon elements, and content elements in the screenshot 140 and confirm or rebut the initial hypotheses. The screenshot conversion module 110 may also preprocess any received images, such as screenshot 140, prior to using the images for training of the set of machine learning models 114 and/or applying the set of trained machine learning models 114 to the images. In some instances, the set of trained machine learning models 114 may be part of the screenshot conversion module 110 or may be accessed on another machine (e.g., server machine 150) by the screenshot conversion module 110. Based on the output of the set of trained machine learning models 114, the screenshot conversion module 110 may obtain an assessment of a quality of one or more hypotheses for structural elements, icon elements, and content elements in the screenshot 140.

Server machine 150 may be a rackmount server, a router computer, a personal computer, a portable digital assistant, a mobile phone, a laptop computer, a tablet computer, a camera, a video camera, a netbook, a desktop computer, a media center, or any combination of the above. The server machine 150 may include a training engine 151. The set of machine learning models 114 may refer to model artifacts that are created by the training engine 151 using the training data that includes training inputs and corresponding target outputs (correct answers for respective training inputs). During training, patterns in the training data that map the training input to the target output (the answer to be predicted) can be found, and are subsequently used by the machine learning models 114 for future predictions. As described in more detail below, the set of machine learning models 114 may be composed of, e.g., a single level of linear or non-linear operations (e.g., a support vector machine [SVM]) or may be a deep network, i.e., a machine learning model that is composed of multiple levels of non-linear operations). Examples of deep networks are neural networks including convolutional neural networks, recurrent neural networks with one or more hidden layers, and fully connected neural networks.

Convolutional neural networks include architectures that may provide efficient application identification. Convolutional neural networks may include several convolutional layers and subsampling layers that apply filters to portions of the screenshot to detect certain features. That is, a convolutional neural network includes a convolution operation, which multiplies each image fragment by filters (e.g., matrices), element-by-element, and sums the results in a similar position in the interactive screenshot 150 (example architecture shown in FIG. 7).

As noted above, the set of machine learning models 114 may be trained to determine the most confidential structural elements, icon elements, and content elements in the screenshot 140 using training data, as further described below. Once the set of machine learning models 114 are trained, the set of machine learning models 114 can be provided to screenshot conversion module 110 for analysis of new screenshot 140. For example, the screenshot conversion module 110 may input the screenshot 140 being analyzed into the set of machine learning models 114. The screenshot module 110 may obtain one or more outputs from the set of trained machine learning models 114. The output is an assessment of a quality of one or more hypotheses for structural elements, icon elements, and content elements (e.g., an indication of whether the hypotheses are correct).

Figure 2:
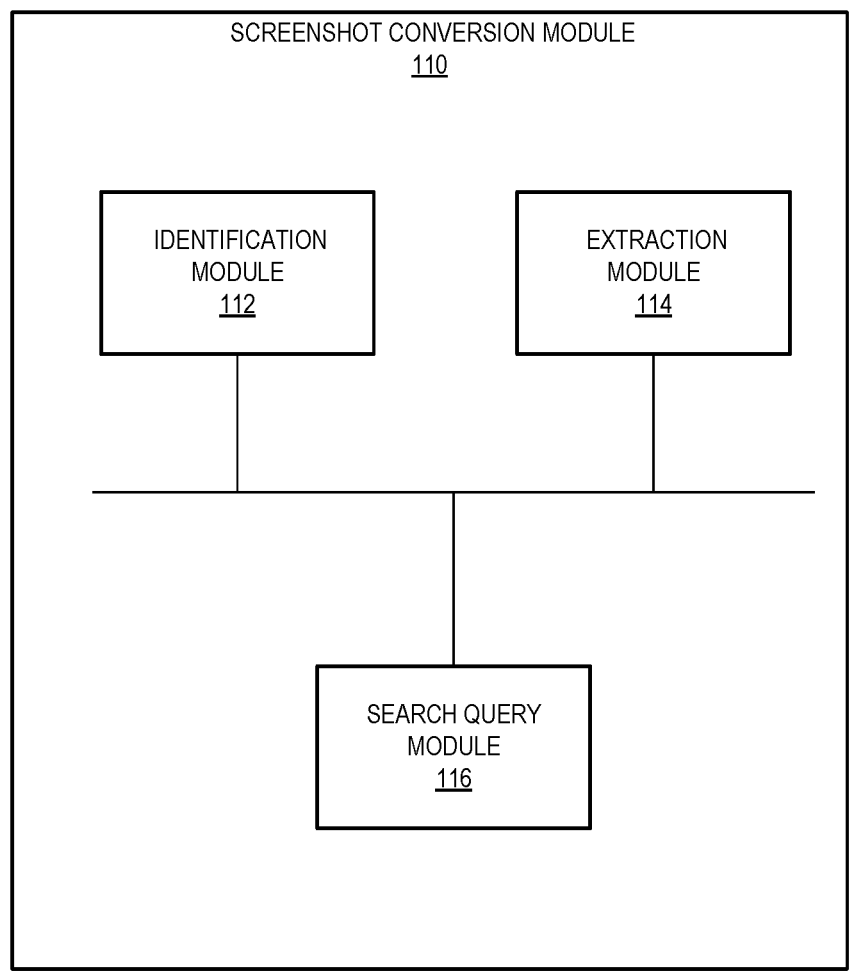
FIG. 2 illustrates a schematic diagram of an example screenshot conversion subsystem that generates an interactive screenshot based on a static screenshot, in accordance with some embodiments of the present disclosure.

FIG. 2 illustrates a block diagram of an example the screenshot conversion module 110 in accordance with one or more aspects of the present disclosure. The screenshot conversion module 110 may be a software module running on computing device 120 of FIG. 1. The screenshot conversion module 110 may include an identification module 112, an extraction module 114, and a search query module 116. One or more of the identification module 112, the extraction module 114, the search query module 116, or a combination thereof, may be implemented by one or more software modules running on one or more hardware devices.

The identification module 112 can receive a screenshot 140 for processing via computer vision to identify an application in the screenshot 140. Computer vision can be used to extract meaningful information from the screenshot 140. Computer vision can include, for example, content-based image retrieval, optical character recognition, or any suitable image processing technique capable of performing the techniques described herein. Computer vision can be implemented via machine learning such as, for example, convolution neural network (CNN), artificial neural network (ANN), deep neural network (DNN) or any other suitable neural network or deep learning capable of identifying applications within a screenshot 140

Figure 3:
FIG. 3 is an exemplary illustration of processing a static screenshot to determine an application of the screenshot, in accordance with some embodiment of the present disclosure.

To identify the application in the screenshot 140, the identification module 112 may use computer vision to categorize different elements of the screenshot 140 into different categories (e.g., a category that corresponds to a model of neural networks). For example, the screenshot 140 may include structural elements 142a-h (e.g. application markers), as shown in FIG. 3. The structural elements 142a-h can be elements of the graphical user interface (GUI) of the application, such as, for example, icons, buttons, title, logos, or any other suitable GUI elements. Accordingly, the identification module 112 can include a structure category, an icons category, and a content category. During the process of categorizing the different element of the screenshot, the identification module 112 may discard other elements that may confuse the model of the neural networks corresponding to the categories.

The identification module 112 may use neural networks to process each category to identify which application the screenshot 140 is of Based on the results of the neural network of each of the categories, the identification module 112 may weigh each result to make a determination of what application is present in the screenshot 140. In some instances, a high level neural network may be use to process the results of the neural network of each of the categories to assist with determination of which application is present in the screenshot 140. Applications can include a social media application, a web page or web browser, a messaging application, or any other third party application on a computing device. In some instances, the identification module 112 may not be able to identify a specific application other than the fact that it is a text-rich application or image-rich application.

Figure 4:
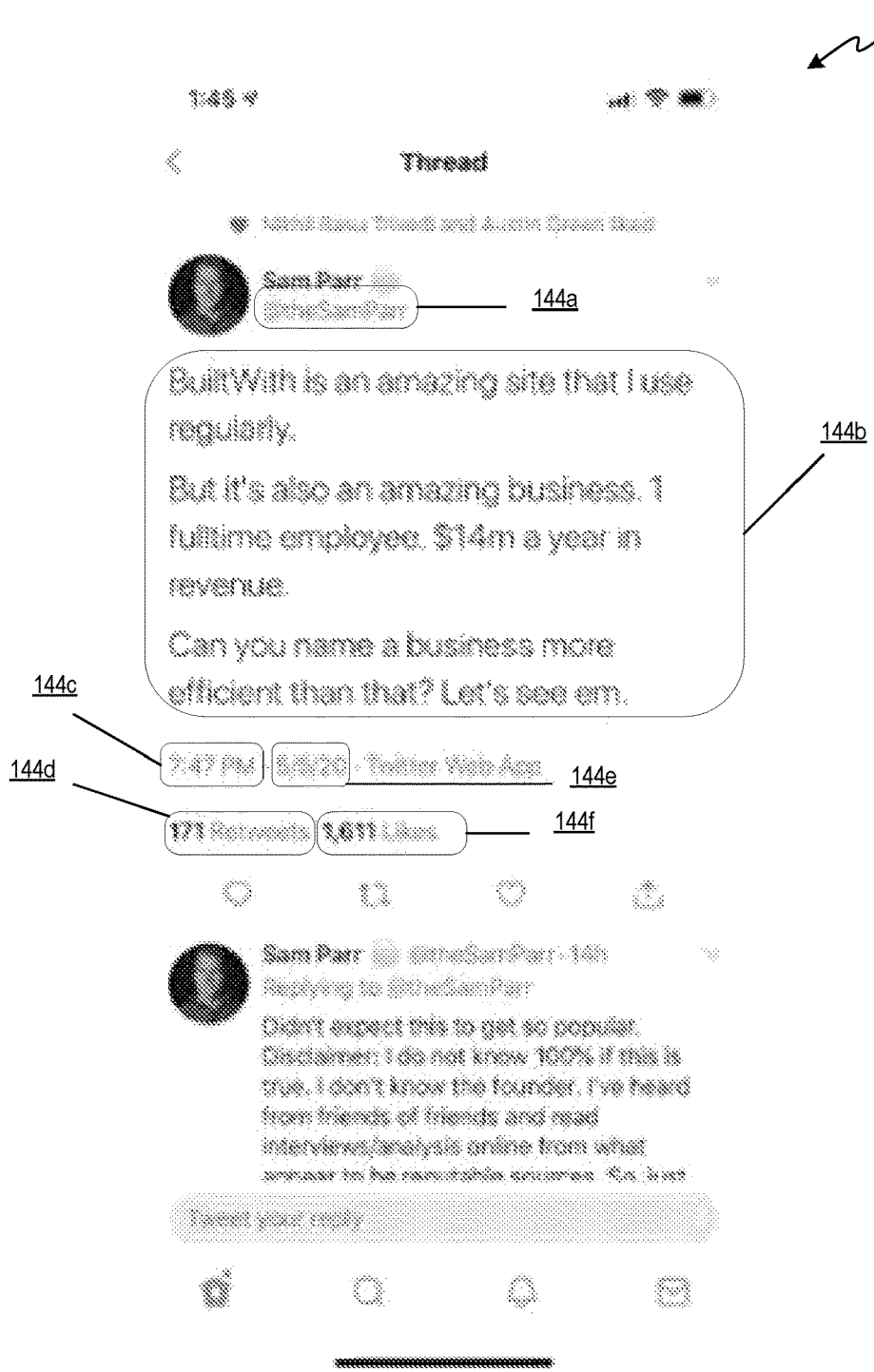
FIG. 4 is an exemplary illustration of processing a static screenshot to extract content of the application of the screenshot, in accordance with some embodiment of the present disclosure.

The extraction module 114 can extract, based on an application that has been identified within screenshot 140, content 144a-f (e.g., content markers), as shown in FIG. 4, using computer vision to be transmitted to the search query module 116. Depending on the embodiment, the extracted content 144a-f would be extracted (e.g., cropped) into individual elements (e.g., images). Content can be text, images, URLs, or any other suitable information that is associated with contents of the application. For example, in instances in which the identified application is a social media application, for example, the extracted contents 144a-f can be images, user name, comments, number of comments, duration of a video post, text, date and time of the post, or any other suitable information necessary to determine the content and where it may be found. For example, in instances in which the identified application is a message application, for example, the contents to be extracted can be URL and/or images, or any other information that may be shared through messaging applications.

The search query module 116 can perform a query search based on the extracted contents received from the extraction module 114 and the identified application determined by the identification module 112 to obtain a URL for each extracted content to be used in an interactive screenshot 150 (FIG. 1). The search query module 116 can include various approaches to arrive at a URL based on the extracted content and identified application.

In some embodiments, the search query module 116 may arrive at a URL through web-crawling or web-scraping. Web-crawling is the method of systematically browsing the internet to arrive at a desired URL. Web-scraping is the method extracting content and data (e.g., underlying HTML code) from the desired website. Accordingly, the search query module 116 based on the identified application can be redirected to the URL of the identified application (e.g., Twitter website). Based on the identified application, the search query module 116 may use the extracted contents to navigate to a specific webpage of the website (e.g., user name is the extracted content being used to redirect from the Twitter website to the webpage hosting the user's profile where one or more other extracted contents may be located). At which point, the search query module 116 may perform web-scraping on the webpage to extract content and data (e.g., underlying XML data, HTML data, DOM data, or any other suitable data) from the website. The search query module 116 can further compare the extracted content (e.g., caption of the tweet) from the extraction module 114 with the XML and/or HTML data of the webpage (e.g., tweets, dates and time of tweet, and caption of tweets), and based on the comparison the search query module 116 can determine based on a degree of confidence (e.g., a percentage of successful comparison) that the extracted contents are in fact from the URL containing the XML and/or HTML data. Depending on the embodiments, the search query module 116 may further compare the extracted content (e.g., image) with images from the URL to further determine based on a degree of confidence (e.g., a percentage of successful comparison) that the screenshot 140 is in fact a screenshot of the URL.

In some embodiments, the search query module 116 may arrive at a URL through an application programming interface (API) of the identified application based on the extracted content. API is a method of interfacing between multiple software applications by processing calls or request to send and receive information without exposure to the underlying implementation of the software. Accordingly, based on the identified application from the identification module 112, the search query module 116 sends a request to the API of the identified application (e.g., Twitter API) including the extract content from the extraction module 114 in the request. As a result of the request, the API of the identified application can return, among other information, information identifying the URL location.

In some embodiments, the search query 116 may arrive at a URL through semantic text matching based on the identified application being a text-rich application, website, or webpage (e.g., news article site without any indication as to the URL). Accordingly, based on the identified application from the identification module 112, the extracted content from the extraction module 114 is essentially text. Therefore, the search query module 116 performs a semantic text matching with the extracted content (e.g., text) by identifying a collection of text that include a predetermined number of unique words that can be used as identifiers (i.e., a sentence of a particular length with a predefined number of unique words).

In some instances the collection of text from the extract contents can be adjusted by using natural language processing to more accurately represent the extracted contents. For example, levenshtein distance, can make adjustments to the extracted content prior to (e.g., or concurrently with) performing a search for the URL that corresponds to the screenshotted contents. Various searching engines can be used to search the unique collections of text of the extracted content to arrive at a URL (e.g., Google search). Once the URL is determined, further semantic text matching can be performed on the extracted content and text within the determined URL to determine based on a degree of confidence (e.g., a percentage of successful comparison) that the screenshot 140 is in fact a screenshot of the determined URL.

In some embodiments, the search query 116 may arrive at a URL through reverse image searching based on the identified application being an image-rich application, website, or webpage (e.g., Pinterest web page without any indication as to the URL). Accordingly, based on the identified application from the identification module 112, the extracted content from the extraction module 114 is essentially an image, therefore, the search query module 116 performs a reverse image search on the extracted content (e.g., image(s)). Based on the results, the search query module 116 may receive a URL that corresponds to the extracted content. In some instances, the search query module 116 may perform further web-scraping and/or web-crawling to arrive at the URL that is more closely related to the extracted content. Additionally, depending on the embodiment, the search query module 116 may further perform image comparison between the images of the received URL and the extracted content to determine based on a degree of confidence (e.g., a percentage of successful comparison) that the extracted content of the screenshot 140 is in fact a screenshot of the URL.

Once the URL has been determined, the screenshot conversion module 110 may update each of the extracted content and the structural elements of screenshot 140 with an interactive element associated with the URL obtained by the search query module 116 and generate an interactive screenshot 150. The interactive element may resemble the extracted content and/or structural element and contains metadata of the URL obtained by the search query module 116 which is clickable and redirects a user to the URL.

Figure 5:
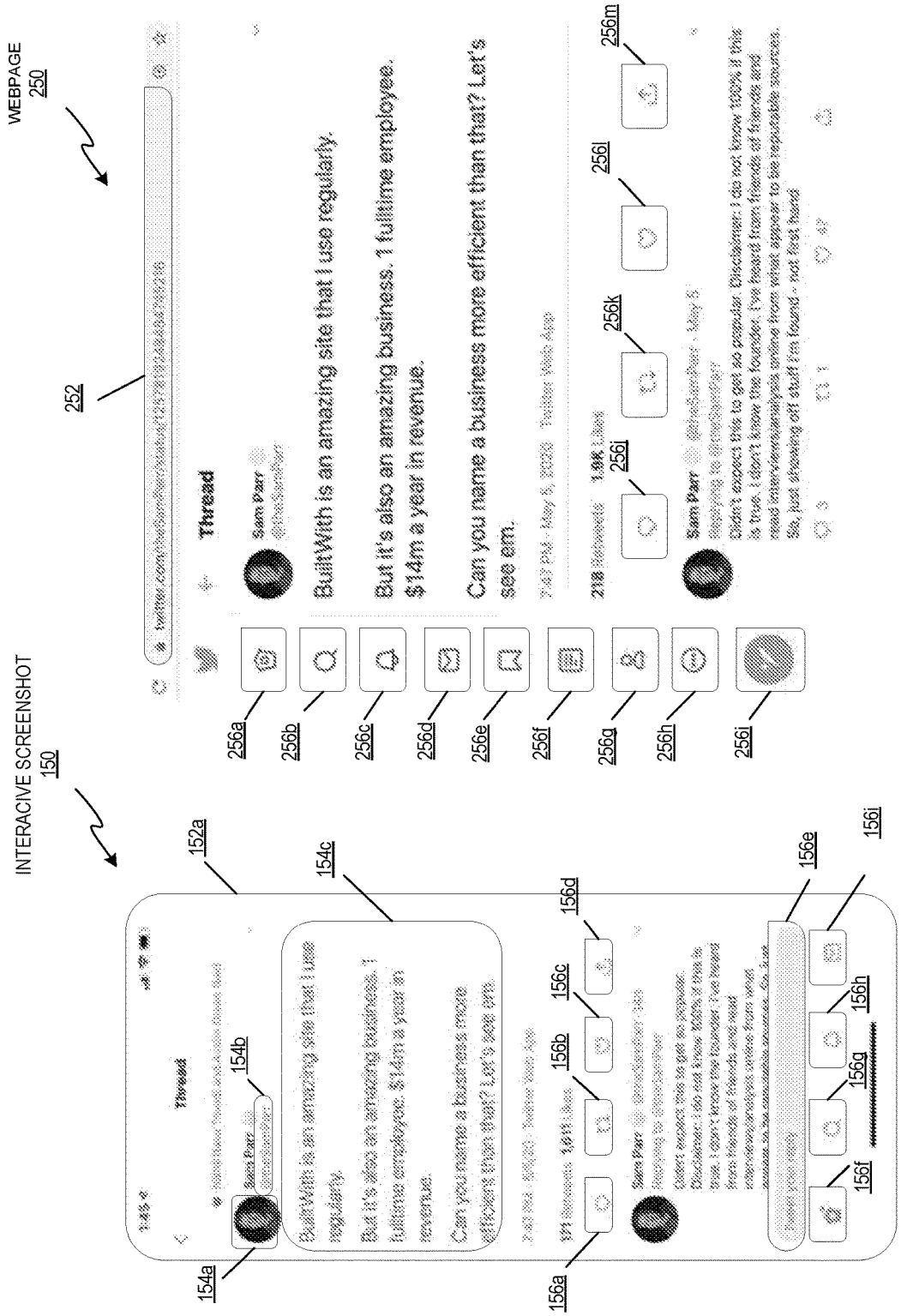
FIG. 5 is an exemplary illustration of an interactive screenshot associated with at least one URL, in accordance with some embodiment of the present disclosure.

FIG. 5 illustrates the interactive screenshot associated with at least one URL in accordance with one or more aspects of the present disclosure. The interactive screenshot 150 can be an interactive element 152a to redirect the user to the webpage 250 with the URL 252. In some embodiment, other portions of the interactive screenshot 150 may be an interactive element to redirect the user to the webpage 250 with the URL 252, such as, for example, interactive elements 154a-c. Interactive elements 156a-l of the interactive screenshot 150 may be used to interact with icons 256a-m of the webpage 250 and provides identical functionality of the webpage to the interactive screenshot (e.g., selecting retweet on the interactive screenshot 150 will redirect the user to a webpage to retweet or retweet directly from the screenshot 150).

Figure 6:
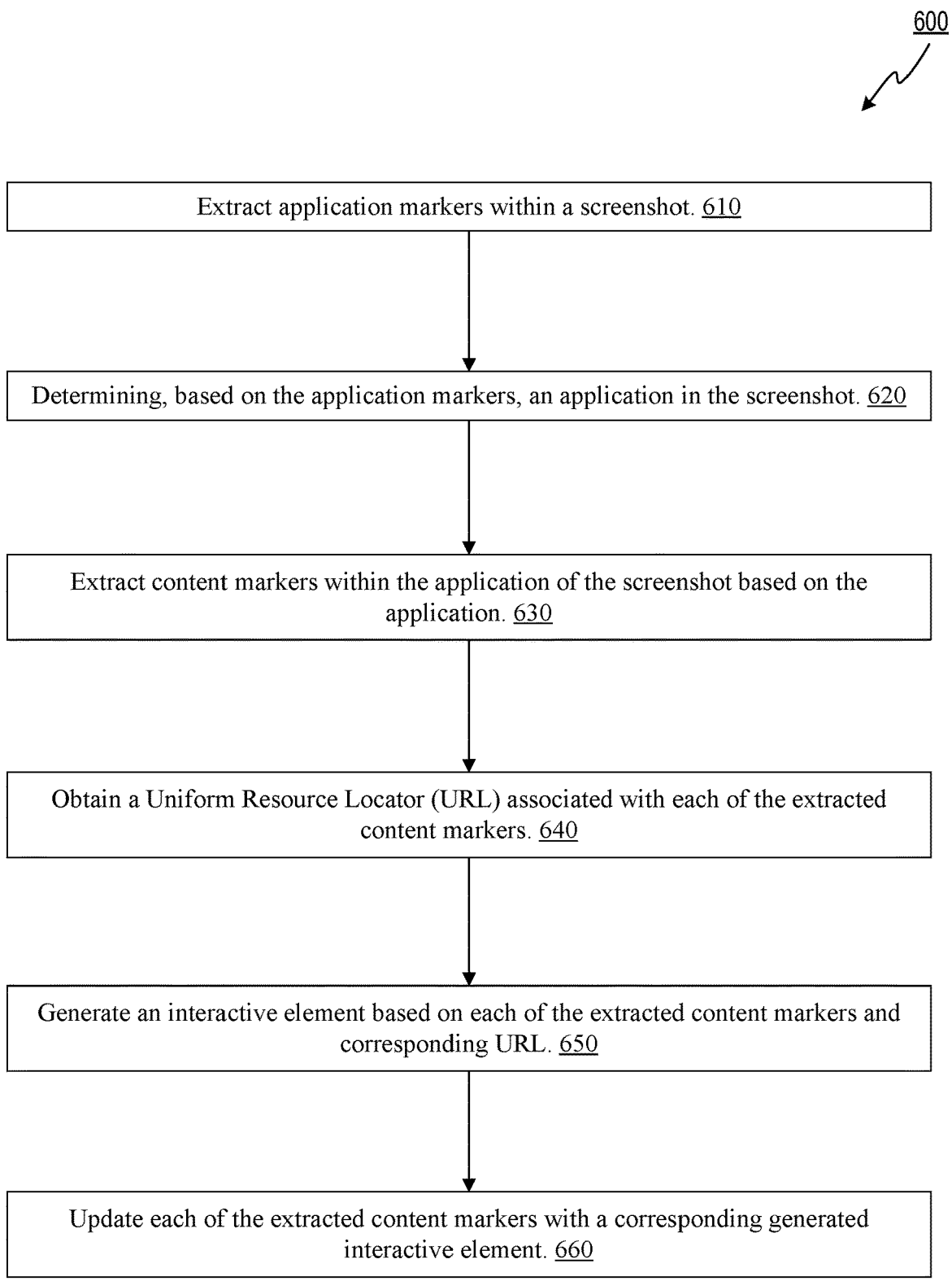
FIG. 6 is a flow diagram of an example method for generating interactive screenshot based on static screenshot, in accordance with some embodiments of the present disclosure.

FIG. 6 is a flow diagram of an example method 600 to generate an interactive screenshot based on a static screenshot, in accordance with some embodiments of the present disclosure. The method 600 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 600 is performed by the screenshot conversion module 110 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 610, the processing logic extracts application markers within a screenshot. To extract application markers within the screenshot, the processing logic, performs image processing on the screenshot to extract structural elements of the screenshot as application markers. At operation 620, the processing logic determines, based on the application markers, an application in the screenshot. To determine, based on the application markers, the application in the screenshot, the processing logic, compares the application markers with structural elements of Graphical User Interface (GUI) of a plurality of applications to determine the application in the screenshot. Depending on the embodiment, in comparing the application markers with structural elements of the GUI of a plurality of applications, the processing logic identifies a location of each of the application markers within the screenshot 140 to compare with a location of the structural elements of the GUI with in the plurality of applications.

At operation 630, the processing logic extracts content markers within the application of the screenshot based on the application. To extract content markers within the application of the screenshot based on the application, the processing logic performs image processing on the screenshot to extract content elements within the application of the screenshot as content markers.

At operation 640, the processing logic obtains a Uniform Resources Locator (URL) associated with each of the extracted content markers. To obtain the URL associated with each of the extracted content makers, the processing logic performs, for each of the extracted content markers, a query search based on the extracted content marker and the determined application.

At operation 650, the processing logic generate an interactive element based on each of the extracted content markers and corresponding URL. In some embodiments, the generated interactive element resembles the content marker that is clickable which when clicked redirects a user to the obtained URL. In some embodiments, the generated interactive element resembles the content marker that is clickable which provides identical functionality to a portion of an actual application that corresponds to the extracted content marker within the determined application. At operation 660, the processing logic updates each of the extracted content markers with a corresponding generated interactive element.

Figure 7:
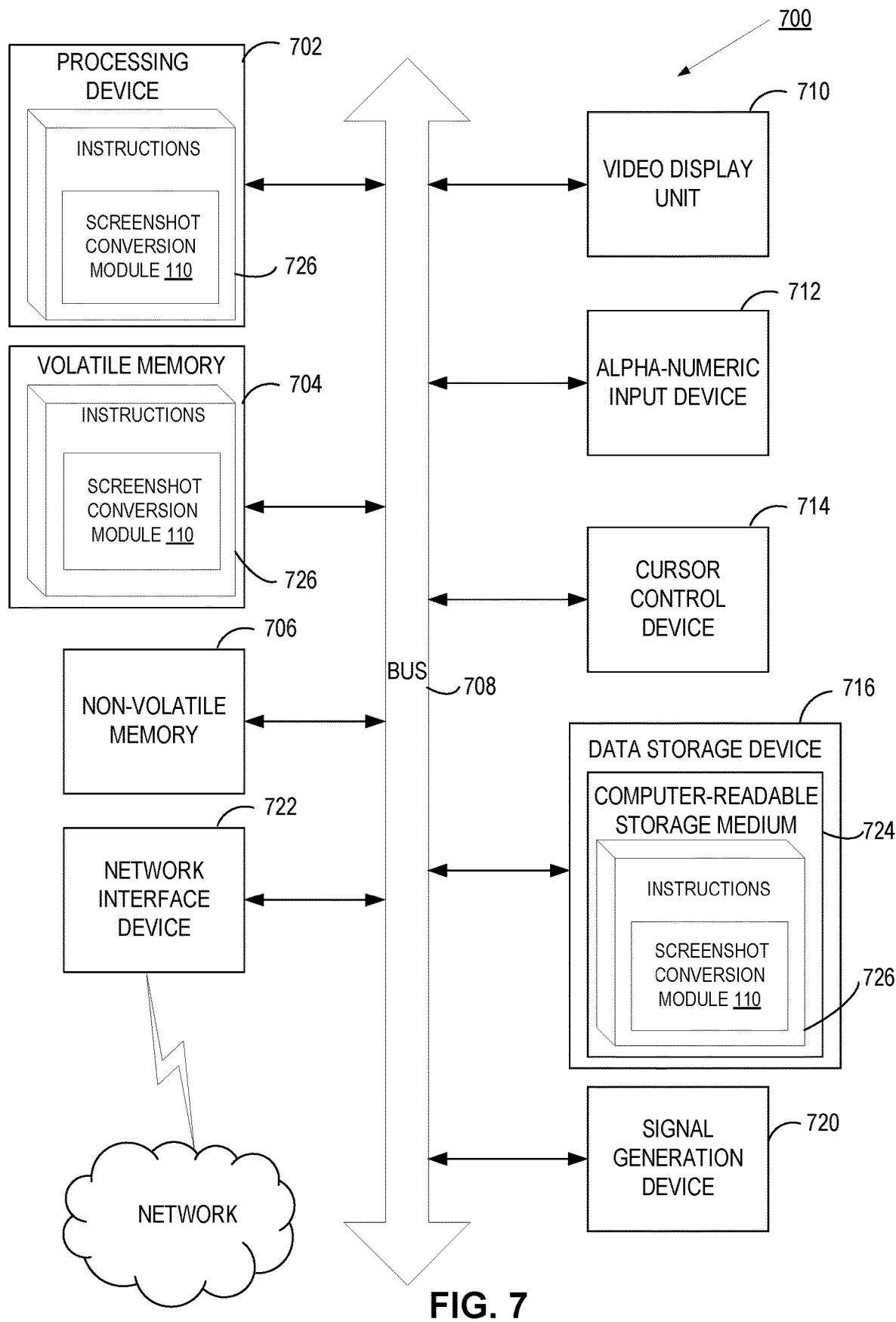
FIG. 7 is a block diagram of an example computer system in which embodiments of the present disclosure may operate.

FIG. 7 depicts an example computer system 700 which can perform any one or more of the methods described herein. The computer system may be connected (e.g., networked) to other computer systems in a LAN, an intranet, an extranet, or the Internet. The computer system may operate in the capacity of a server in a client-server network environment. The computer system may be a personal computer (PC), a tablet computer, a set-top box (STB), a Personal Digital Assistant (PDA), a mobile phone, a camera, a video camera, or any device capable of executing a set of instructions (sequential or otherwise) that specify actions to be taken by that device. Further, while only a single computer system is illustrated, the term "computer" shall also be taken to include any collection of computers that individually or jointly execute a set (or multiple sets) of instructions to perform any one or more of the methods discussed herein.

The exemplary computer system 700 includes a processing device 702, a main memory 704 (e.g., read-only memory (ROM), flash memory, dynamic random access memory (DRAM) such as synchronous DRAM (SDRAM)), a static memory 706 (e.g., flash memory, static random access memory (SRAM)), and a data storage device 716, which communicate with each other via a bus 908.

Processing device 702 represents one or more general-purpose processing devices such as a microprocessor, central processing unit, or the like. More particularly, the processing device 702 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 702 may also be one or more special-purpose processing devices such as an application specific integrated circuit (ASIC), a field programmable gate array (FPGA), a digital signal processor (DSP), network processor, or the like. The processing device 702 is configured to execute instructions 726 for implementing the screenshot conversion module 110 of FIG. 1 and to perform the operations and steps discussed herein (e.g., methods 600 of FIG. 6).

The computer system 700 may further include a network interface device 722. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), and a signal generation device 720 (e.g., a speaker). In one illustrative example, the video display unit 710, the alphanumeric input device 712, and the cursor control device 714 may be combined into a single component or device (e.g., an LCD touch screen).

The data storage device 716 may include a computer-readable storage medium 724 on which is stored the instructions 726 embodying any one or more of the methodologies or functions described herein. The instructions 726 may also reside, completely or at least partially, within the main memory 704 and/or within the processing device 702 during execution thereof by the computer system 700, the main memory 704 and the processing device 702 also constituting computer-readable media. In some implementations, the instructions 726 may further be transmitted or received over a network via the network interface device 722.

While the computer-readable storage medium 724 is shown in the illustrative examples to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

Although the operations of the methods herein are shown and described in a particular order, the order of the operations of each method may be altered so that certain operations may be performed in an inverse order or so that certain operation may be performed, at least in part, concurrently with other operations. In certain implementations, instructions or sub-operations of distinct operations may be in an intermittent and/or alternating manner.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

In the above description, numerous details are set forth. It will be apparent, however, to one skilled in the art, that the aspects of the present disclosure may be practiced without these specific details. In some instances, well-known structures and devices are shown in block diagram form, rather than in detail, in order to avoid obscuring the present disclosure.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving," "determining," "selecting," "storing," "analyzing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer-readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description. In addition, aspects of the present disclosure are not described with reference to any particular programming language. It will be appreciated that a variety of programming languages may be used to implement the teachings of the present disclosure as described herein.

Aspects of the present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read-only memory ("ROM"), random access memory ("RAM"), magnetic disk storage media, optical storage media, flash memory devices, etc.).

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" or "an implementation" or "one implementation" throughout is not intended to mean the same implementation or implementation unless described as such. Furthermore, the terms "first," "second," "third," "fourth," etc. as used herein are meant as labels to distinguish among different elements and may not necessarily have an ordinal meaning according to their numerical designation.

Whereas many alterations and modifications of the disclosure will no doubt become apparent to a person of ordinary skill in the art after having read the foregoing description, it is to be understood that any particular implementation shown and described by way of illustration is in no way intended to be considered limiting. Therefore, references to details of various implementations are not intended to limit the scope of the claims, which in themselves recite only those features regarded as the disclosure.

What is claimed is:

1. A method comprising:
   identifying at least one application in an image;
   extracting one or more content markers within the at least one application of the image to perform a search of the at least one application;
   for each of the one or more content markers, searching the at least one application for a Uniform Resource Locator (URL) corresponding to a respective content marker; and
   replacing the one or more content markers with an interactive element generated from the URL.

2. The method of claim 1, wherein identifying the at least one application in the image comprises:
   extracting at least one application marker within the image; and
   determining, based on the at least one application marker, the at least one application in the image.

3. The method of claim 2, wherein extracting at least one application marker within the image includes performing image processing on the image to extract structural elements of the image as the at least one application marker.

4. The method of claim 2, wherein determining, based on the at least one application marker, the at least one application in the image includes comparing the at least one application marker with structural elements of Graphical User Interface (GUI) of a plurality of applications to determine the at least one application in the image.

5. The method of claim 1, wherein extracting one or more content markers within the at least one application of the image based on the at least one application includes performing image processing on the image to extract content elements within the at least one application of the image as the one or more content markers.

6. The method of claim 1, wherein the interactive element resembles a content marker of the one or more content markers that is responsive to user input which provides similar or identical functionality to a portion of an actual application that corresponds to the content marker of the one or more content markers within the at least one application.

7. The method of claim 1, wherein searching the at least one application for the Uniform Resource Locator (URL) corresponding to a respective content marker comprises:
   performing at least one of: web-scraping the at least one application to obtain the URL corresponding to the respective content marker or at least one application programming interface (API) of the at least one application to obtain the URL corresponding to the respective content marker, reverse image search.

8. A system comprising:
   a memory; and
   a processor, operatively coupled with memory, to perform operations comprising:
   identifying at least one application in an image;
   extracting one or more content markers within the at least one application of the image to perform a search of the at least one application;
   for each of the one or more content markers, searching the at least one application for a Uniform Resource Locator (URL) corresponding to a respective content marker; and
   replacing the one or more content markers with an interactive element generated from the URL.

9. The system of claim 8, wherein identifying the at least one application in the image includes extracting at least one application marker within the image and determining, based on the at least one application marker, the at least one application in the image.

10. The system of claim 9, wherein extracting at least one application marker within the image includes performing image processing on the image to extract structural elements of the image as the at least one application marker.

11. The system of claim 9, wherein determining, based on the at least one application marker, the at least one application in the image includes comparing the at least one application marker with structural elements of Graphical User Interface (GUI) of a plurality of applications to determine the at least one application in the image.

12. The system of claim 8, wherein extracting one or more content markers within the at least one application of the image based on the at least one application includes performing image processing on the image to extract content elements within the at least one application of the image as the one or more content markers.

13. The system of claim 8, wherein the interactive element resembles a content marker of the one or more content markers that is responsive to user input which provides similar or identical functionality to a portion of an actual application that corresponds to the content marker of the one or more content markers within the at least one application.

14. The system of claim 8, wherein searching the at least one application for the Uniform Resource Locator (URL) corresponding to a respective content marker includes performing at least one of: web-scraping the at least one application to obtain the URL corresponding to the respective content marker or at least one application programming interface (API) of the at least one application to obtain the URL corresponding to the respective content marker, reverse image search.

15. A non-transitory computer-readable storage medium comprising instructions that, when executed by a processing device, cause the processing device to perform operations comprising:
   identifying at least one application in an image;
   extracting one or more content markers within the at least one application of the image to perform a search of the at least one application;
   for each of the one or more content markers, searching the at least one application for a Uniform Resource Locator (URL) corresponding to a respective content marker; and
   replacing the one or more content markers with an interactive element generated from the URL.

16. The non-transitory computer-readable storage medium of claim 15, wherein identifying the at least one application in the image includes extracting at least one application marker within the image and determining, based on the at least one application marker, the at least one application in the image.

17. The non-transitory computer-readable storage medium of claim 16, wherein extracting at least one application marker within the image includes performing image processing on the image to extract structural elements of the image as the at least one application marker.

18. The non-transitory computer-readable storage medium of claim 16, wherein determining, based on the at least one application marker, the at least one application in the image includes comparing the at least one application marker with structural elements of Graphical User Interface (GUI) of a plurality of applications to determine the at least one application in the image.

19. The non-transitory computer-readable storage medium of claim 15, wherein the interactive element resembles a content marker of the one or more content markers that is responsive to user input which provides similar or identical functionality to a portion of an actual application that corresponds to the content marker of the one or more content markers within the at least one application.

20. The non-transitory computer-readable storage medium of claim 15, wherein searching the at least one application for the Uniform Resource Locator (URL) corresponding to a respective content marker includes performing at least one of: web-scraping the at least one application to obtain the URL corresponding to the respective content marker or at least one application programming interface (API) of the at least one application to obtain the URL corresponding to the respective content marker, reverse image search.

* * * * *